US009990029B2

(12) United States Patent
Kochi

(10) Patent No.: US 9,990,029 B2
(45) Date of Patent: *Jun. 5, 2018

(54) INTERFACE OBJECT AND MOTION CONTROLLER FOR AUGMENTED REALITY

(71) Applicant: Sony Interactive Entertainment Europe Limited, London (GB)

(72) Inventor: Masami Kochi, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 7 days.

This patent is subject to a terminal disclaimer.

(21) Appl. No.: 15/096,251

(22) Filed: Apr. 11, 2016

(65) Prior Publication Data
US 2016/0224103 A1 Aug. 4, 2016

Related U.S. Application Data

(63) Continuation of application No. 13/761,033, filed on Feb. 6, 2013, now Pat. No. 9,310,882.
(Continued)

(51) Int. Cl.
G06T 19/00 (2011.01)
G06F 3/00 (2006.01)
(Continued)

(52) U.S. Cl.
CPC ............ *G06F 3/005* (2013.01); *A63F 13/10* (2013.01); *A63F 13/20* (2014.09); *A63F 13/213* (2014.09);
(Continued)

(58) Field of Classification Search
USPC ........................................ 345/419, 632, 633
See application file for complete search history.

(56) References Cited

U.S. PATENT DOCUMENTS

2005/0276444 A1* 12/2005 Zhou .................... G06F 3/04815
382/103
2005/0285878 A1* 12/2005 Singh ................ H04M 1/72544
345/633
(Continued)

FOREIGN PATENT DOCUMENTS

KR 10-2010-0067155 A 6/2010

OTHER PUBLICATIONS

"Opening the Tokyo International Book Fair, "Pop-up" Picture Book Utilizing the AR is also", Satoru Matsuda,Jun. 9, 2009, [online], [searched on Jun. 13, Heisei 28], Internet<URL:http://internet.watch.impress.co.jp/docs/event/tkybook16th/300973.html.
(Continued)

*Primary Examiner* — Kimbinh T Nguyen
(74) *Attorney, Agent, or Firm* — Martine Penilla Group, LLP

(57) ABSTRACT

A method for interfacing with an interactive program is provided. Images of an interface object and a motion controller disposed in a gameplay environment are captured, a tag defined on a surface of the interface object. The captured images are analyzed to identify the tag on the surface of the interface object. Movement of the interface object is tracked by tracking the tag. Augmented images are generated by replacing, in the captured images, the tag with a virtual object, wherein generating the augmented images includes processing the tracked movement of the interface object to define movement of the virtual object. The captured images are analyzed to identify a pointing direction of the motion controller in the gameplay environment. The pointing direction of the motion controller is processed to identify a selection of a portion of the virtual object. The augmented images are presented on a display.

20 Claims, 20 Drawing Sheets

Related U.S. Application Data

(60) Provisional application No. 61/595,685, filed on Feb. 6, 2012.

(51) Int. Cl.

| | | |
|---|---|---|
| *G06F 3/01* | (2006.01) | |
| *A63F 13/655* | (2014.01) | |
| *A63F 13/52* | (2014.01) | |
| *A63F 13/213* | (2014.01) | |
| *A63F 13/40* | (2014.01) | |
| *A63F 13/20* | (2014.01) | |
| *A63F 13/65* | (2014.01) | |
| *G06T 13/20* | (2011.01) | |

(52) U.S. Cl.
CPC .............. *A63F 13/52* (2014.09); *A63F 13/65* (2014.09); *A63F 13/655* (2014.09); *G06F 3/011* (2013.01); *G06F 3/017* (2013.01); *G06T 13/20* (2013.01); *G06T 19/006* (2013.01); *A63F 2300/1093* (2013.01); *A63F 2300/69* (2013.01)

(56) References Cited

U.S. PATENT DOCUMENTS

| | | | | |
|---|---|---|---|---|
| 2005/0289590 | A1* | 12/2005 | Cheok | G06Q 30/02 725/37 |
| 2010/0199232 | A1* | 8/2010 | Mistry | G06F 1/163 715/863 |
| 2011/0063415 | A1* | 3/2011 | Gefen | H04N 5/4403 348/43 |
| 2011/0169861 | A1 | 7/2011 | Suzuki et al. | |
| 2011/0242007 | A1* | 10/2011 | Gray | G06F 3/0488 345/173 |
| 2011/0292078 | A1* | 12/2011 | Lapstun | H04N 1/00129 345/632 |
| 2012/0200573 | A1* | 8/2012 | Stoner | G09B 5/02 345/472 |
| 2012/0223968 | A1* | 9/2012 | Kashimoto | G06T 11/00 345/633 |
| 2012/0299961 | A1* | 11/2012 | Ramkumar | G06F 17/30047 345/632 |
| 2012/0319949 | A1 | 12/2012 | Lee | |
| 2013/0076788 | A1* | 3/2013 | Ben Zvi | G06T 19/006 345/633 |
| 2013/0147687 | A1* | 6/2013 | Small | G09G 5/00 345/8 |
| 2013/0171603 | A1* | 7/2013 | Self | G09B 5/065 434/317 |

OTHER PUBLICATIONS

"All about AR", Junichi Rekimoto, Nikkei BP, Jun. 1, 2009, First edition, p. 127-128 (Document showing known technique).

\* cited by examiner

INTERFACE OBJECT AND MOTION CONTROLLER FOR AUGMENTED REALITY

CLAIM OF PRIORITY

This application claims priority from U.S. Provisional Patent Application No. 61/595,685 filed on Feb. 6, 2012, and entitled "BOOK OBJECT FOR AUGMENTED REALITY," which is incorporated herein by reference in its entirety for all purposes.

BACKGROUND

1. Field of the Invention

The present invention relates to methods and systems for interfacing with an interactive program utilizing a book object for augmented reality.

2. Description of the Related Art

Advances in gaming technology have provided for video games featuring rich graphics and audio. However, new methods of interfacing with video games are sought to improve the player experience.

It is in this context that embodiments of the invention arise.

SUMMARY

Embodiments of the present invention provide methods and systems for interfacing with an interactive program utilizing a book object for augmented reality. It should be appreciated that the present invention can be implemented in numerous ways, such as a process, an apparatus, a system, a device or a method on a computer readable medium. Several inventive embodiments of the present invention are described below.

In one embodiment, a method for interfacing with an interactive program is provided, including the following method operations: capturing images of first and second pages of a book object, the first and second pages being joined substantially along a fold axis defined along a spine of the book; analyzing the captured images to identify a first tag on the first page and a second tag on the second page; tracking movement of the first and second pages by tracking the first and second tags, respectively; generating augmented images by replacing, in the captured images, the book object with a virtual book, the virtual book having a first virtual page corresponding to the first page of the book object, the virtual book having a second virtual page corresponding to the second page of the book object, wherein movement of the first and second pages of the book object controls movement of the first and second virtual pages of the virtual book, respectively; rendering first and second scenes on the first and second virtual pages, respectively, the first or second scene defining an animation; and presenting the augmented images on a display.

In one embodiment, the movement of the first and second pages includes turning the second page about the fold axis, an orientation of the rendered second scene relative to the second page being maintained during the turning the second page.

In one embodiment, the animation defines movement of at least one three-dimensional object in proximity to the first or second virtual page on which the first or second scene defining the animation is defined.

In one embodiment, the animation provides an appearance of compression of the three-dimensional object when the second page converges on the first page or an appearance of decompression of the three-dimensional object when the second page diverges from the first page.

In one embodiment, turning the second page about the fold axis exposes a third page on an opposite side of the second page and a fourth page joined to the third page substantially along the fold axis; analyzing the captured images includes identifying a third tag on the third page and a fourth tag on the fourth page; tracking movement includes tracking movement of the third and fourth pages by tracking the third and fourth tags, respectively; the virtual book having a third virtual page corresponding to the third page of the book object, the virtual book having a fourth virtual page corresponding to the fourth page of the book object, wherein movement of the third and fourth pages of the book object controls movement of the third and fourth virtual pages of the virtual book, respectively; rendering includes rendering third and fourth scenes on the third and fourth virtual pages, respectively; and during the turning of the second page about the fold axis, an orientation of the rendered third scene relative to the third virtual page is maintained.

In another embodiment, a system for interfacing with an interactive program is provided, including: means for capturing images of first and second pages of a book object, the first and second pages being joined substantially along a fold axis defined along a spine of the book; means for analyzing the captured images to identify a first tag on the first page and a second tag on the second page; means for tracking movement of the first and second pages by tracking the first and second tags, respectively; means for generating augmented images by replacing, in the captured images, the book object with a virtual book, the virtual book having a first virtual page corresponding to the first page of the book object, the virtual book having a second virtual page corresponding to the second page of the book object, wherein movement of the first and second pages of the book object controls movement of the first and second virtual pages of the virtual book, respectively; means for rendering first and second scenes on the first and second virtual pages, respectively, the first or second scene defining an animation; and means for presenting the augmented images on a display.

In another embodiment, an apparatus for interfacing with an interactive program is provided, including: an image capture device for capturing images of first and second pages of a book object, the first and second pages being joined substantially along a fold axis defined along a spine of the book; an analyzer module for analyzing the captured images to identify a first tag on the first page and a second tag on the second page; a tracking module for tracking movement of the first and second pages by tracking the first and second tags, respectively; an augmented image generator for generating augmented images by replacing, in the captured images, the book object with a virtual book, the virtual book having a first virtual page corresponding to the first page of the book object, the virtual book having a second virtual page corresponding to the second page of the book object, wherein movement of the first and second pages of the book object controls movement of the first and second virtual pages of the virtual book, respectively; a rendering module for rendering first and second scenes on the first and second virtual pages, respectively, the first or second scene defining an animation; and a presenter for presenting the augmented images on a display.

In another embodiment, a system for interfacing with an interactive program is provided, including: a book object having first and second pages being joined substantially along a fold axis defined along a spine of the book object;

a client device for capturing images of the first and second pages of the book object; a server, including, an analyzer module for analyzing the captured images to identify a first tag on the first page and a second tag on the second page; a tracking module for tracking movement of the first and second pages by tracking the first and second tags, respectively; an augmented image generator for generating augmented images by replacing, in the captured images, the book object with a virtual book, the virtual book having a first virtual page corresponding to the first page of the book object, the virtual book having a second virtual page corresponding to the second page of the book object, wherein movement of the first and second pages of the book object controls movement of the first and second virtual pages of the virtual book, respectively; a rendering module for rendering first and second scenes on the first and second virtual pages, respectively, the first or second scene defining an animation; and wherein the client device includes a presenter for presenting the augmented images on a display.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
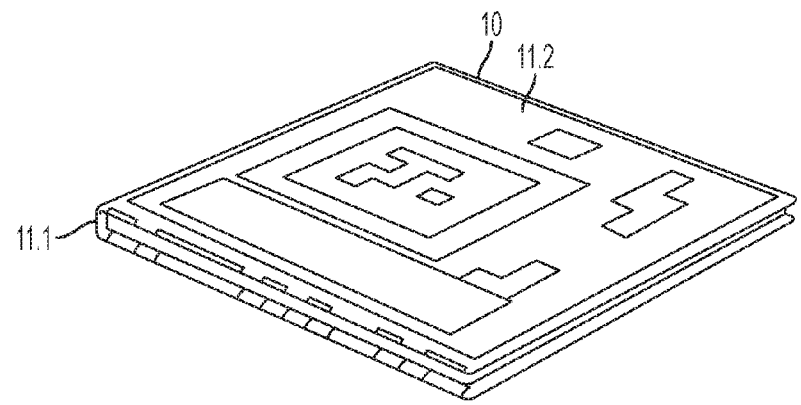
FIGS. 1 and 2 illustrate a book object 10 for augmented reality (AR), in accordance with an embodiment of the invention.
Figure 2:
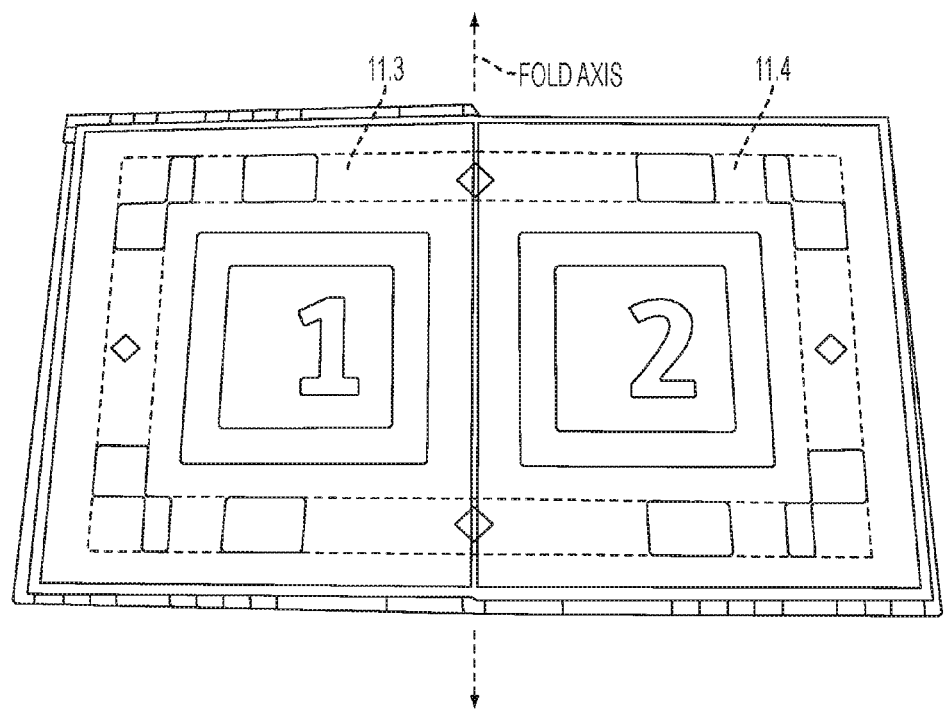

FIGS. 1 and 2 illustrate a book object 10 for augmented reality (AR), in accordance with an embodiment of the invention. Generally speaking, the book object has a front cover, a back cover, and pages in between the front and back covers, each of which contain unique AR tags. The book object is captured by an image capture device and the AR tags are recognized through an image recognition process. Based on this image recognition, the location and orientation of the book object is determined. Also, the specific page or cover that is being shown to the image capture device is determined based on recognition of the AR tags. In FIG. 1, the book is shown in a closed configuration, with the front cover visible.

For ease of understanding throughout the present disclosure, a "page" shall refer to the area defined on one side of a sheet. Thus, each sheet can define two pages—one on the front side of the sheet and one on the back side of the sheet opposite the front side. Turning a given page will expose the next/previous page defined on the opposite side of the sheet on which the given page is defined, and may also expose an adjacent page to the next/previous page. Broadly speaking, the book object is composed of a series of sheets which are joined together along the spine 11.1 of the book. The front side of the first sheet defines the front cover page 11.2 of the book; the back side of the first sheet defines the first page 11.3 of the book; the front side of the second sheet defines the second page 11.4; the back side of the second sheet defines the third page; and so on, with the front side of the last sheet of the book defining the last page of the book, and the back side of the last sheet defining the back cover page of the book. A fold axis is defined substantially along the spine of the book. When a page is turned, it is turned substantially about the fold axis. For example, the second page 11.4 can be turned substantially about the fold axis onto the first page, simultaneously exposing third and fourth pages.

The book object can be constructed from any suitable material, including paper, cardboard, plastic, metal, or any other material from which sheets may be formed to include tags as described herein. In one embodiment, the sheets of the book are substantially rigid, to maintain the planar surface of each page during page turns and other manipulations of the book.

FIG. 2 shows the book open to the first page 11.3 and second page 11.4. The pages of the book can include numbers corresponding to the ordering of the pages which are also part of the AR tags of the pages. This allows users to more intuitively know which page of the book object is currently shown. However, it will be noted that numbers are optional.

The book object can be a platform for many different types of interactions, including augmented reality interactions and command and control type interactions. In some embodiments, the surfaces of the book object are replaced on screen by computer-generated graphics. In other embodiments, the motion and orientation of the book object can be utilized to provide input for a video game or other interactive program. By way of example, the book object can be utilized to tell interactive stories with interactive elements shown on the pages of the book.

Figure 3:
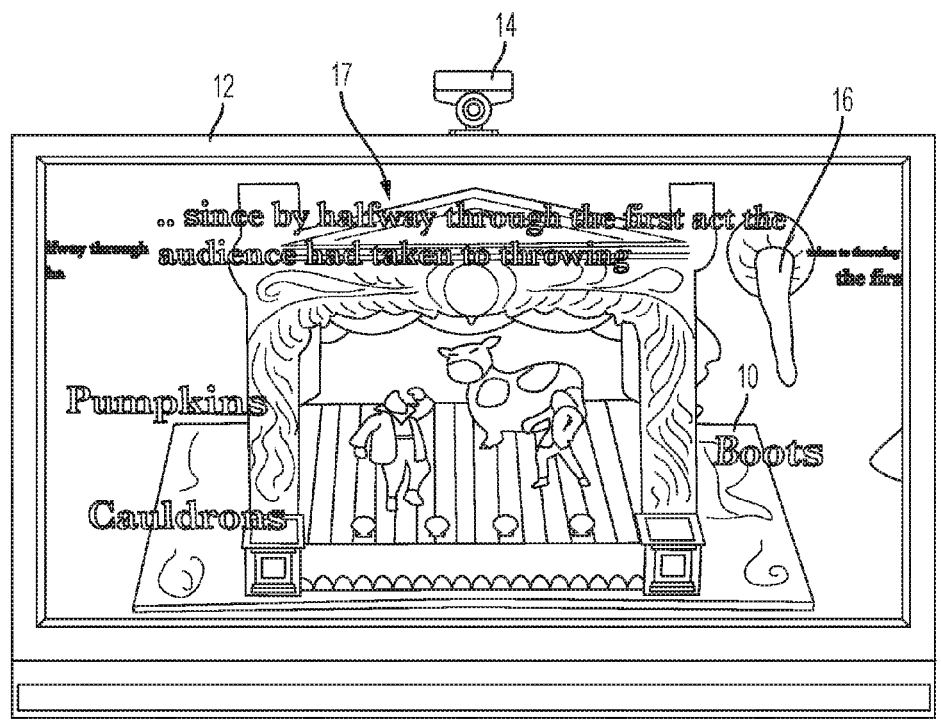
FIG. 3 shows a book object displayed on a display as it is being captured by an image capture device and processed, in accordance with an embodiment of the invention.

FIG. 3 shows the book object 10 displayed on a display 12 as it is being captured by an image capture device 14 and processed, in accordance with an embodiment of the invention. The image capture device 14 captures images of the book object 10, which are analyzed to identify and track the AR tags on the pages of the book. In the captured images, scenes can be displayed on the pages. In the illustrated embodiment, the AR tags of the book object have been completely replaced with a pop-up puppet theater 17 that appears above the book. An animated story unfolds within the pop-up puppet theater. The user (not shown) controls a wand 16 by manipulating a motion controller. It will be appreciated that as the book object is moved, the pop-up puppet theater moves in synchronization with the book object, as the pop-up puppet theater is defined with reference to the location and orientation of the exposed pages of the book object 10. In a sense, the pop-up puppet theater is anchored to the pages of the book object 10, so that its orientation relative to the pages of the book object 10 are maintained as the book is manipulated by the user. For example, by rotating the book object 10, the user can rotate the puppet theater in a similar manner; or by tilting the book object 10, the user can tilt the puppet theater in a similar manner. By rotating or tilting the book object 10, the user exposes portions of the puppet theater for viewing.

It will be appreciated that the pop-up puppet theater can also exhibit an animated folding mechanic that is responsive to folding of the book object 10, similar to the folding mechanic of a real-world pop-up book. That is, the pop-up theater may appear to unfold from a substantially flat configuration to its three-dimensional configuration when the book is opened (or the appropriate page is turned), and refold to its flat configuration when the book is closed (or one of its underlying pages is turned to a next/previous page). The angle of adjacent pages relative to each other (about the fold axis) can be ascertained from analyzing the captured images of the adjacent pages, and this angle can be utilized to determine the animated state of unfolding of the pop-up puppet theater.

Figure 4:
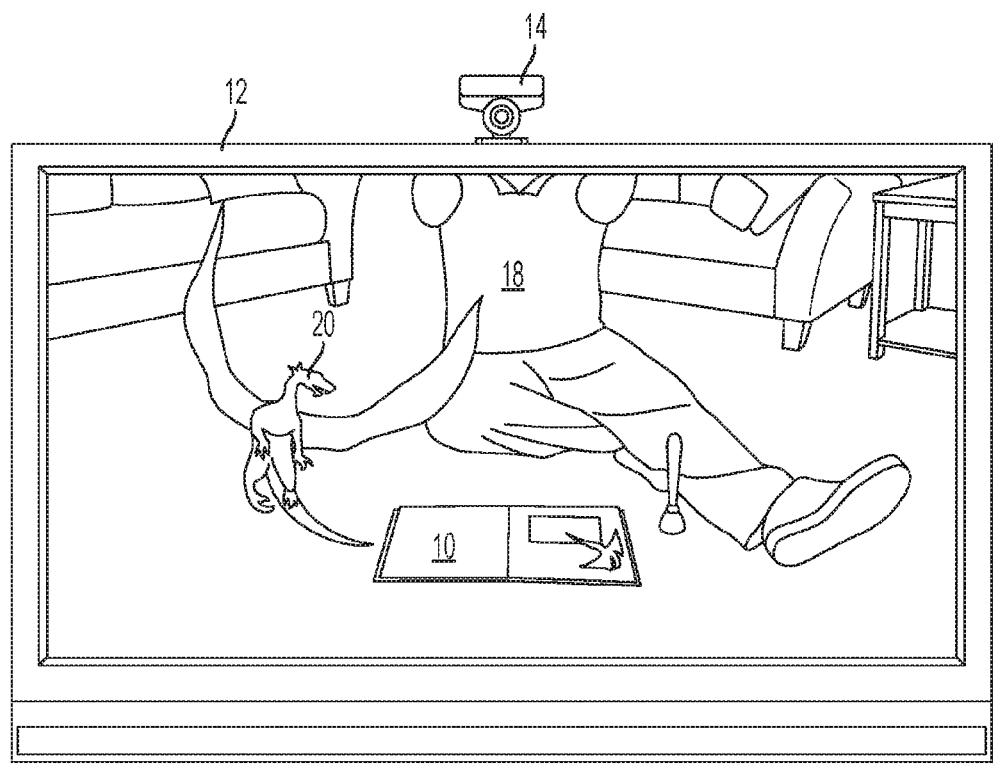
FIG. 4 shows a frame from a series of augmented captured images rendered on the display, in accordance with an embodiment of the invention.

FIG. 4 shows a frame from a series of augmented captured images rendered on the display 12, in accordance with an embodiment of the invention. It will be appreciated that the image capture device is configured to capture video from the gameplay environment defined by a series of captured images and accompanying audio data. The captured images can be augmented based on tracking tags included in the pages of the book object 10. In the illustrated frame, the book object 10 is open on the floor in front of a user 18. The book object 10 has been augmented so as to be transformed into a magical book with interactive elements displayed on the pages of the book. The interactive elements can include any of various objects, including but not limited to, words, pictures, animations, three-dimensional objects, etc. In the illustrated embodiment, an animated dragon 20 has originated from the pages of the book and has escaped from the book.

Figure 5:
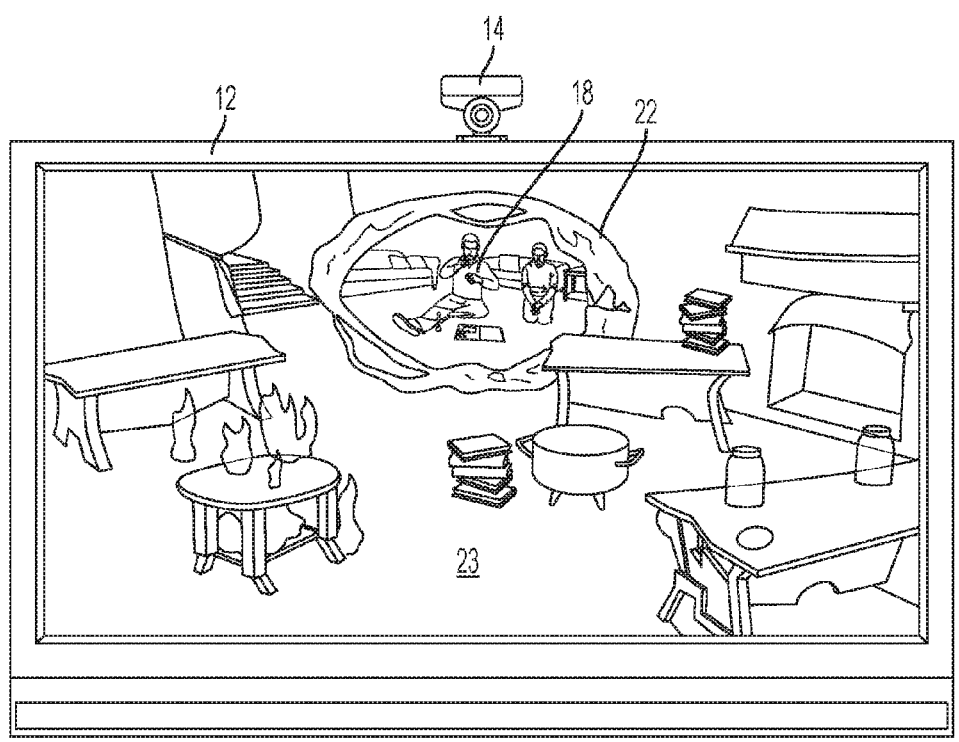
FIG. 5 shows a camera view having become a small inset as a 3-D (three dimensional) scene fills the screen of a display, in accordance with an embodiment of the invention.

FIG. 5 shows the camera view having become a small inset 22 as a 3-D (three dimensional) scene 23 fills the screen of the display 12, in accordance with an embodiment of the invention. The effect is such that the onscreen view appears to zoom out from the user's location to reveal the 3-D scene, giving the user a sense of discovering that they are in a virtual world. In the illustrated embodiment, the user 18 uses the wand to cast fire spells at paper bugs crawling around the room.

Figure 6:
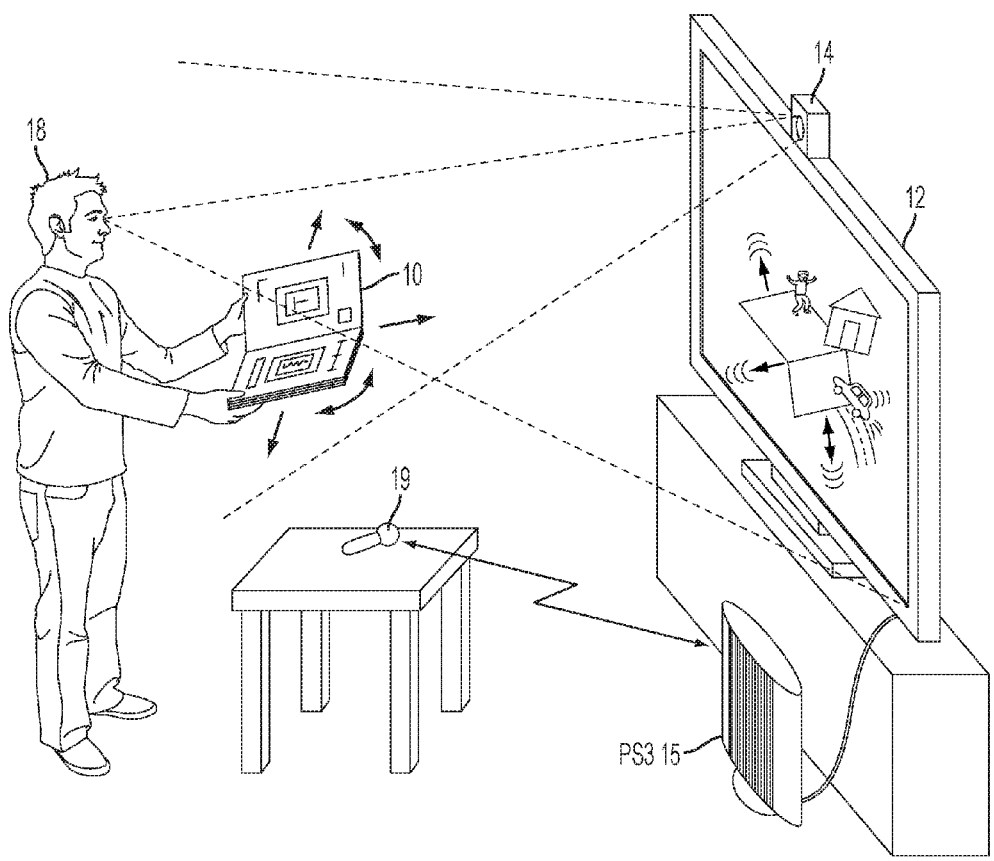
FIG. 6 illustrates a book object controlled by a user as it is being detected by image capture device, in accordance with an embodiment of the invention.

FIG. 6 illustrates the book object 10 controlled by a user 18 as it is being detected by image capture device 14, in accordance with an embodiment of the invention. An interactive application utilizing the recognized AR tags of the book object 10 is displayed on the display 12. The image capture device is connected to computing device 15. The computing device 15 includes at least one processor and memory configured to execute an interactive application. The computing device 15 can be configured to include an image analysis module for analyzing captured images from the image capture device 14 to identify and track tags on the pages of the book object 10. Additionally, the computing device may include a rendering module that augments the captured images by rendering scenes on the pages of the book in the captured images. It will be appreciated that the computing device 15 can be a console gaming system, a general or special purpose computer, set-top box, personal computer, laptop, or any other kind of computing device which can be configured to receive captured image data and augment it as described herein for rendering on a display. One example of a console gaming system is the Playstation® 3 console gaming system. Additionally, the computing device may communicate with a motion controller 19. One example of a motion controller is the Playstation® Move™ motion controller.

Figure 6A:
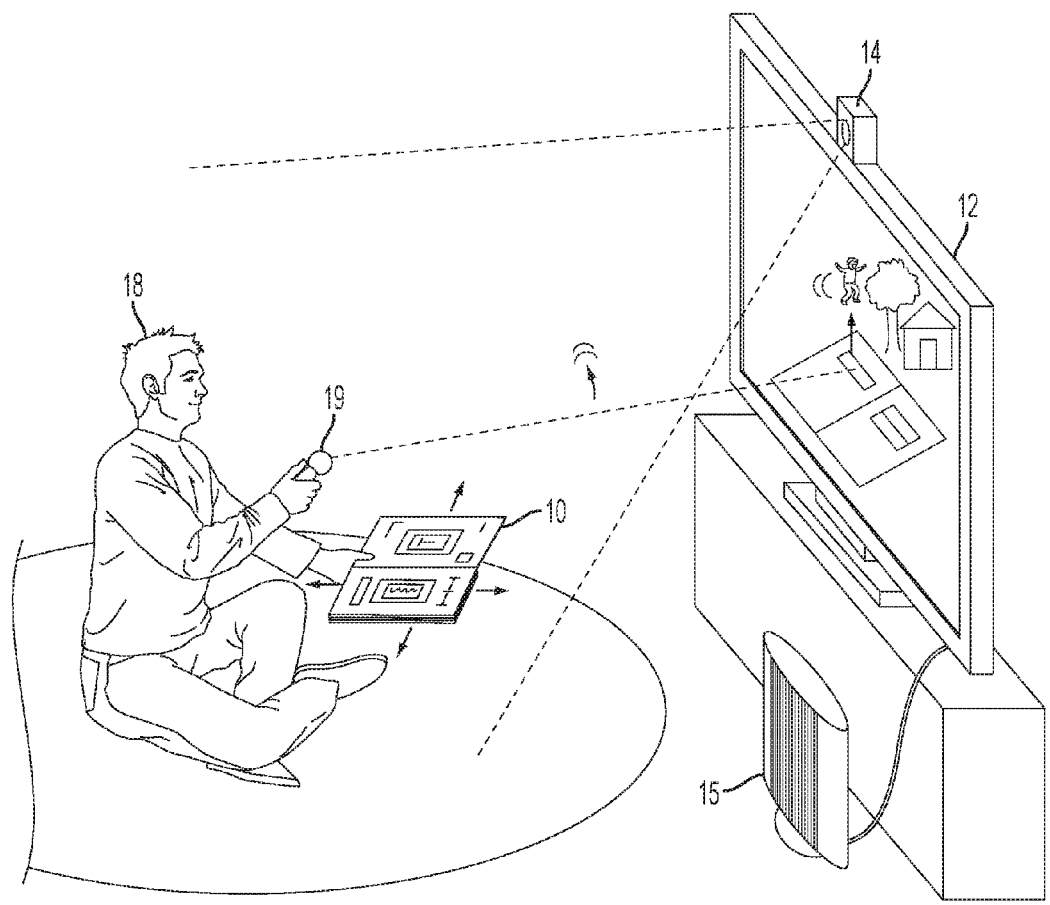
FIG. 6A shows a user seated on the floor and manipulating a book object while simultaneously operating a motion controller to point at various selectable portions of the rendered book on a display, in accordance with an embodiment of the invention.

FIG. 6A shows the user 18 seated on the floor and manipulating the book object 10 while simultaneously operating the motion controller 19 to point at various selectable portions of the rendered book on the display 12, in accordance with an embodiment of the invention. In one embodiment, the user may point the motion controller 19 towards portions of the book object 10 while viewing the augmented book on the display 12 to ascertain virtual elements present on the pages of the book. The user may point to a selectable portion to indicate a selection when the portion is so configured.

Figure 6B:
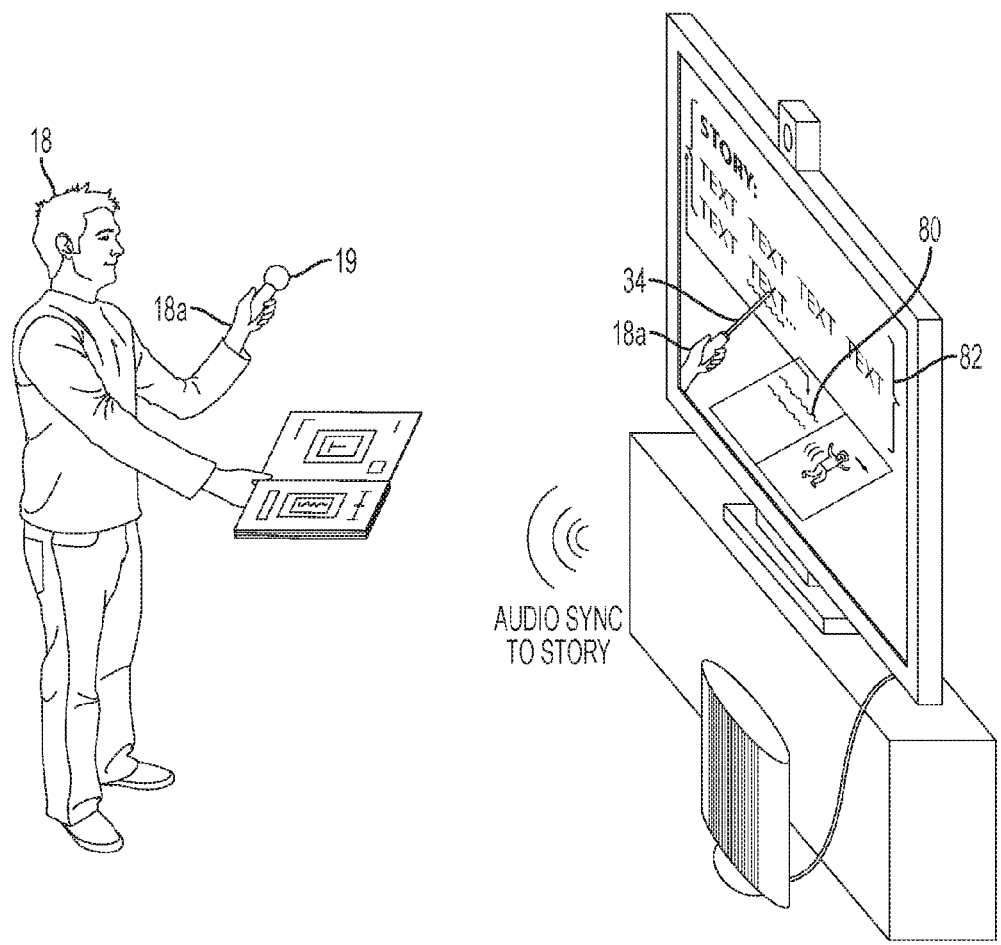
FIG. 6B shows the user 18 maneuvering the motion controller 19 to control a wand 34 on the display, in accordance with an embodiment of the invention.

FIG. 6B shows the user 18 maneuvering the motion controller 19 to control a wand 34 on the display, in accordance with an embodiment of the invention. The user's hand 18*a* is shown on the display as well. In the illustrated embodiment, the book object is replaced by a rendered book having text 80 shown thereon. The text 80 can be displayed on the screen apart from the rendered book so as to enable the user to read it more easily. Additionally, the text 80 can be selectable when the wand is pointed at it. Audio of the text can be played back through speakers in synchronization with the opening of the book object to pages corresponding to those shown on the display.

Figure 7:
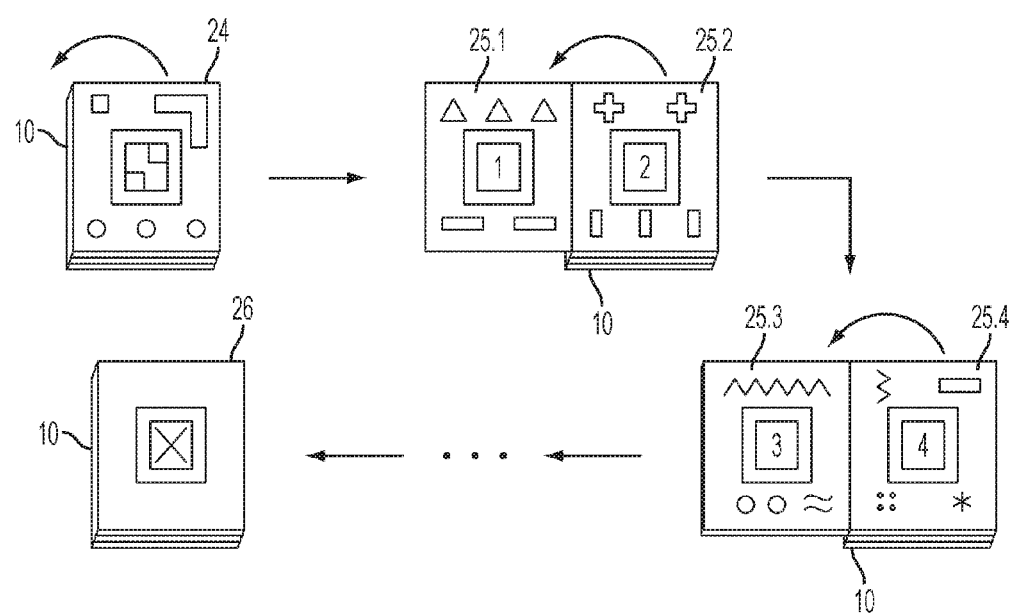
FIG. 7 shows a book object as it is being opened to various pages, in accordance with an embodiment of the invention.

FIG. 7 shows the book object as it is being opened to various pages, in accordance with an embodiment of the invention. The book object has a cover page 24 with a unique AR tag defined thereon. By turning the cover page 24, the book is opened to expose page 1 (reference 25.1) and adjacent page 2 (reference 25.2). As shown, the AR tags associated with pages 1 and 2 having the numerals "1" and "2" incorporated thereon, respectively. This enables the user to easily discern which page of the book object is visible, and may be utilized by an interactive program for interactivity (e.g. specific virtual pages are associated with the pages of the book object; instructing the user to open the book to a specific page number; etc.). By turning page 2 onto page 1, adjacent pages 3 and 4 (reference 25.3 and 25.4, respectively) are exposed for viewing and image capture. Each of pages 3 and 4 has a unique AR tag defined thereon, as well as the respective numeral corresponding to their page number. The pages of the book can be turned until the back cover page 26 of the book object is reached, which also has a unique AR tag defined thereon. It will be appreciated that each page of the book object 10 has a unique AR tag defined thereon, and thus, no two pages share the same AR tag. As such, each page is individually identifiable, and may be configured to correspond to specific content defined for that page.

Though reference is made throughout the present disclosure to augmented reality (AR) tags, it will be appreciated that such tags can be utilized for non-augmented reality applications. For example, the tags may be identified and tracked to define movements of a virtual object. The virtual object can take the form of a book or some other object whose movements correspond to those of the real-world book object as determined through tracking the AR tags on the book object's pages. By way of example, movements can include translational movements as well as folding-type movements or page-turning type movements, and may be applied to any suitable virtual object.

In one embodiment, a book object controller having AR tags that produce interactive AR objects is provided. A book having AR tags as pages can be used as a controller for interactive AR objects that are displayed on the AR tags. The movement and orientation of the book is tracked and the corresponding AR objects are moved and oriented accordingly in the context of a video game or interactive application, so that the book is the controller for the AR objects. The orientation or movement of the book can indicate selection or trigger in-game mechanics such as advancement of the plot of the game or story.

Figure 8:
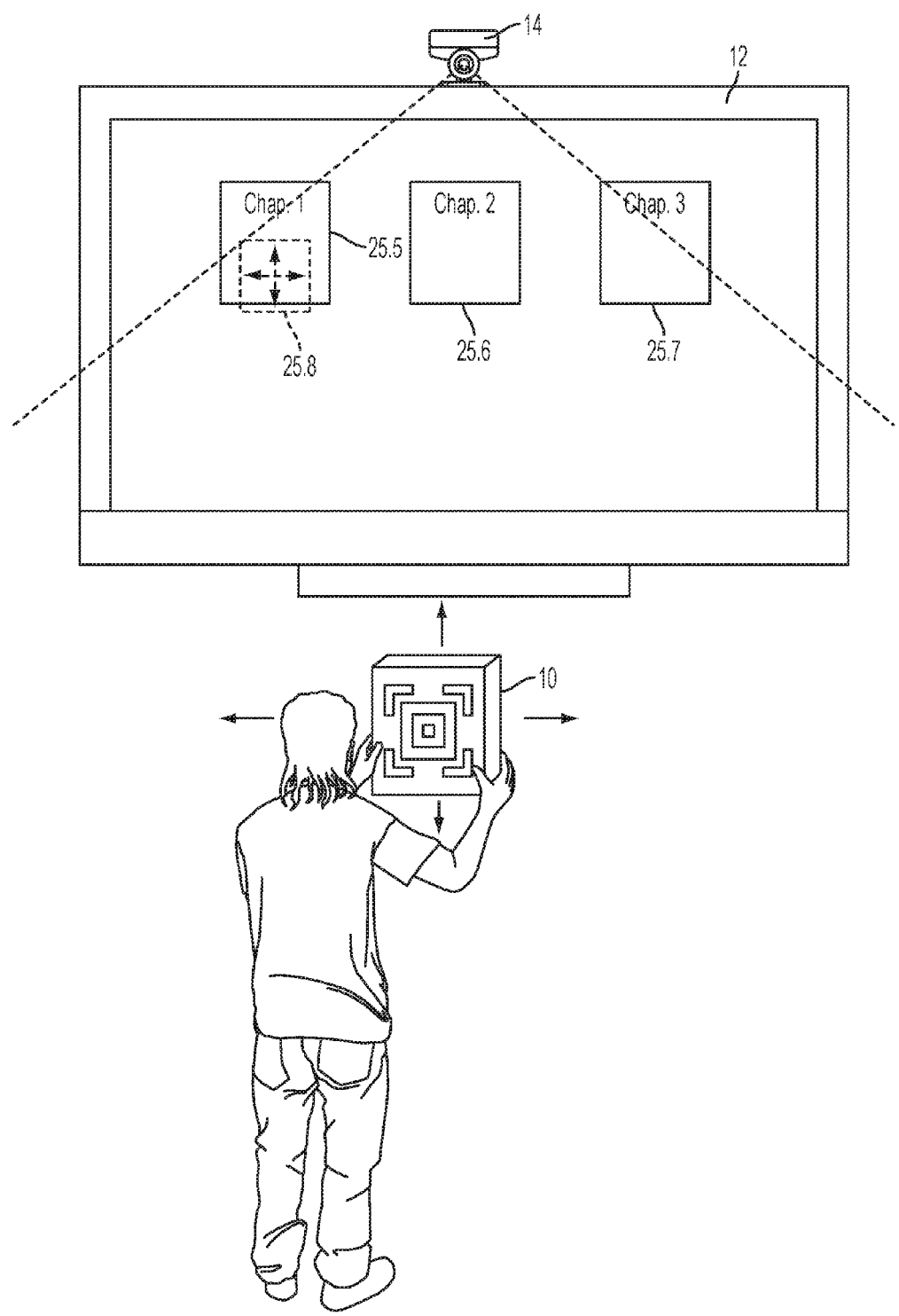
FIG. 8 illustrates the book object being utilized for navigating and selecting amongst options on a menu, in accordance with an embodiment of the invention.

FIG. 8 illustrates the book object being utilized for navigating and selecting amongst options on a menu, in accordance with an embodiment of the invention. As shown in accordance with one embodiment, picking up the book 10 and orienting the front or back cover of the book to face the camera may trigger display of a menu to enable a selection mode whereby the user may select from various options. In one embodiment, triggering of the display of the menu may also pause the current gameplay if any is occurring. In various embodiments, the selection mode may enable the user to select from various chapters of a story, sections of a plot, levels of gameplay, sections of a level, etc. The selection mode may provide access to other features, such as adjustment of game parameters, viewing a map, viewing items or properties associated with the user's gameplay, etc. In the illustrated embodiment, the selection mode includes display of icons 25.5, 25.6, and 25.7 representing chapters 1, 2, and 3, respectively of a story. The book object 10 is utilized as a motion controller to control the motion of an onscreen selector 25.8. In one embodiment, the onscreen selector 25.8 is configured to move in substantially the same direction as the book object is moved (e.g. moving book to the user's left moves the selector 25.8 to the left onscreen, etc.). In one embodiment, when the book 10 is positioned so that the selector 25.8 is substantially over one of the icons, the corresponding chapter is selected by, for example, maintaining the selector 25.8 over the icon for a predetermined amount of time.

Figure 9:
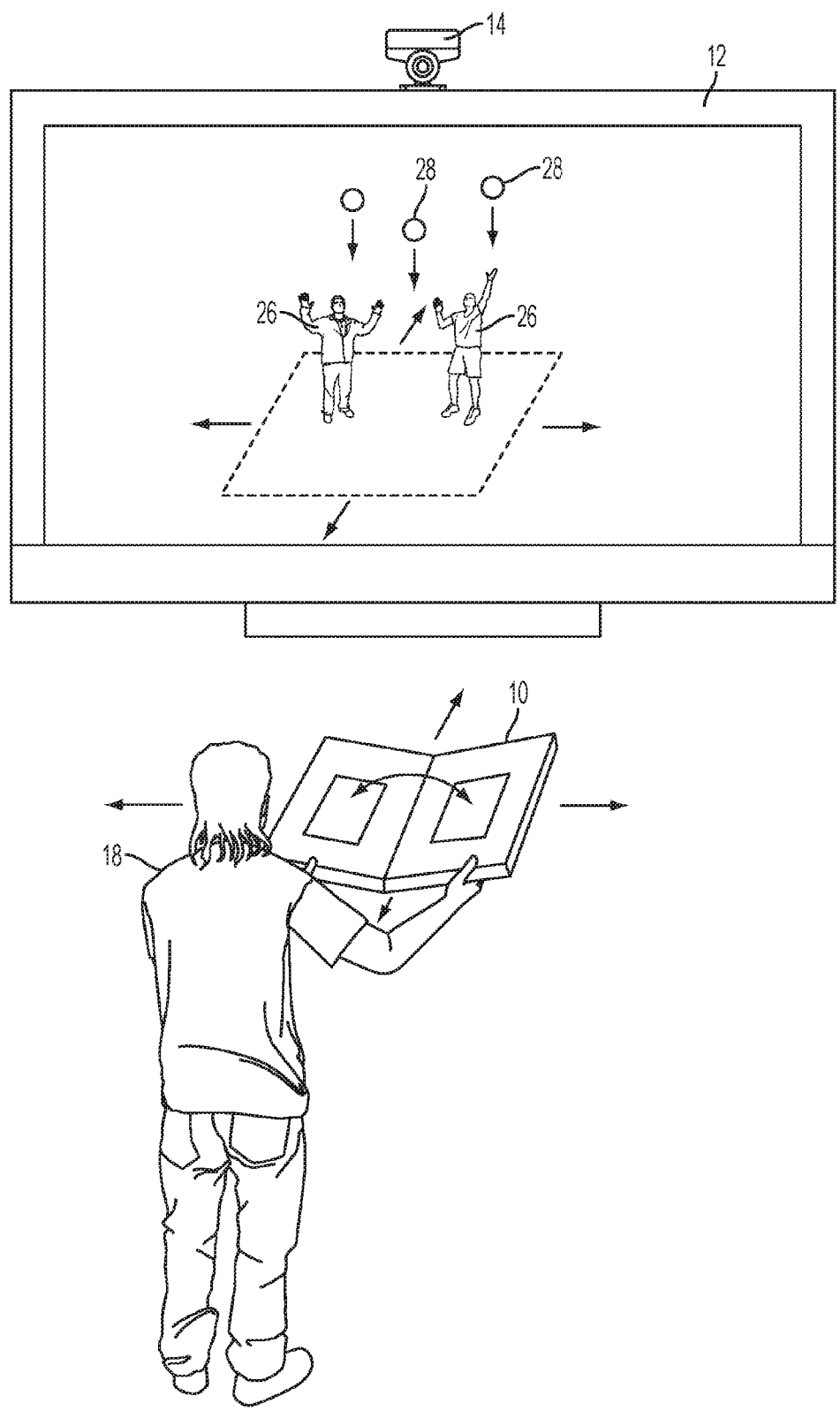
FIG. 9 illustrates a user using a book object to control the movement of onscreen characters to catch falling objects, in accordance with an embodiment of the invention.

FIG. 9 illustrates the user 18 using the book object 10 to control the movement of onscreen characters 26 to catch falling objects 28, in accordance with an embodiment of the invention. The movements of the book object 10 in various directions are mapped to corresponding movements of the characters 26. In one embodiment, closing the book causes the characters 26 to be squeezed closer to each other. The characters may be defined with reference to the pages of the book as they are rendered/augmented onscreen. Thus, when the book object 10 is folded/closed, the characters 26 tilt towards each other as their orientations to their respective pages is maintained. While characters are shown, it will be appreciated that the book object 10 can similarly control the movement of any object in an interactive application.

Figure 10:
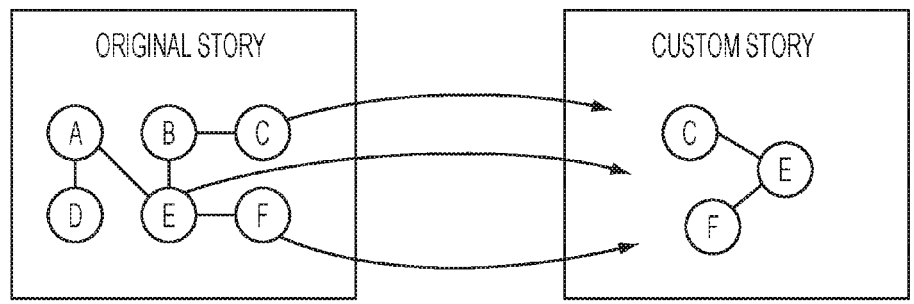
FIG. 10 illustrates a book story AR object collection for constructing custom stories, in accordance with an embodiment of the invention.

In another embodiment, with reference to FIG. 10, a book story AR object collection for constructing custom stories is provided. A book of AR tags can be utilized to tell an original story with various AR objects of the original story being displayed over the AR tags based on the location and orientation of the book. The AR objects can be collectible or purchasable by users and utilized by users to generate their own custom stories. The AR objects can be linked or utilized in various ways that may differ from their usage in the original story. Examples of collectible AR objects can include characters, buildings, vehicles, natural objects, etc. Similar concepts can be applied to a video game, enabling users to build their own video games or video game levels.

Figure 11A:
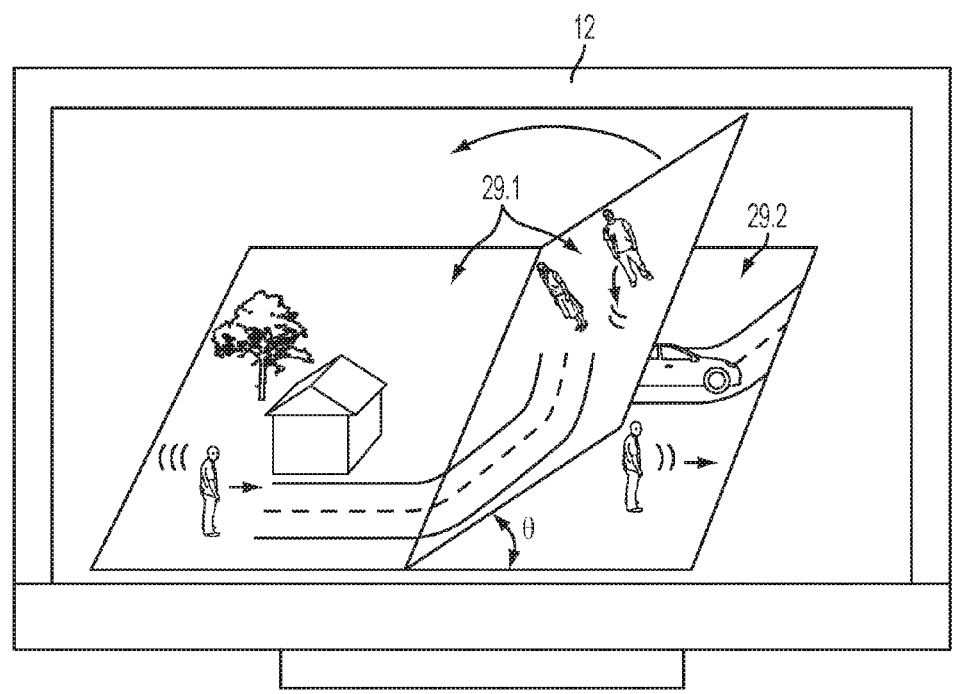
FIG. 11A illustrates a book object as it is opened to reveal a spread of two AR tags that are viewable and recognized by a video game system, in accordance with an embodiment of the invention.
Figure 11B:
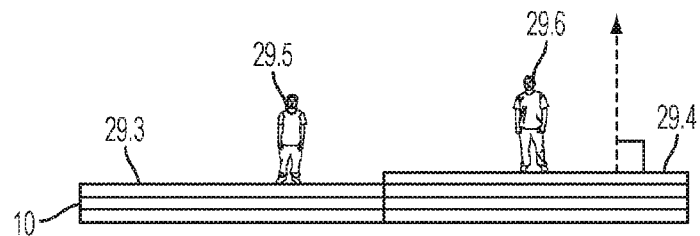
FIGS. 11B, 11C, 11D, and 11E illustrate various stages of a page turning mechanic, in accordance with an embodiment of the invention.
Figure 11C:
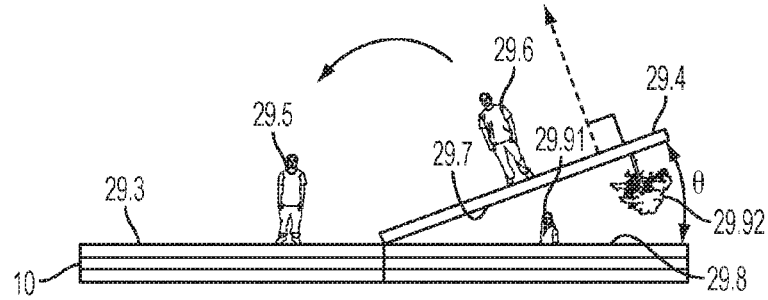
Figure 11D:
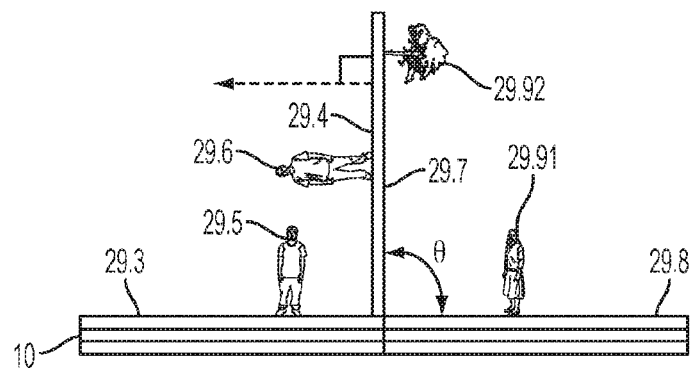
Figure 11E:
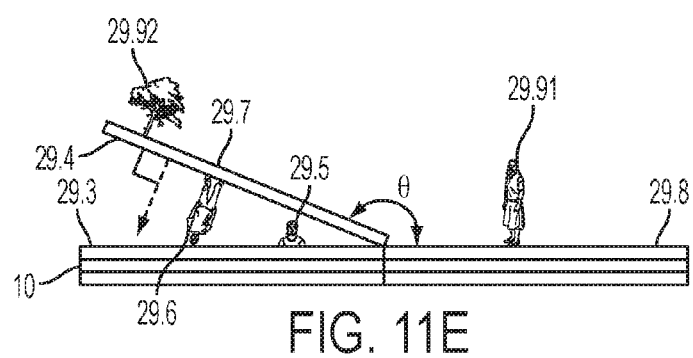

Various book object page turning mechanics are contemplated. For example, with reference to FIG. 11A, when the book is opened, a spread of two AR tags is viewable and recognized by the video game system. As the book is opened, a virtual scene or display 29.1 pops up on the opened book. As a page is turned, the existing virtual scene 29.1 corresponding to a particular two-page spread is closed or folded down on itself, and the next virtual scene 29.2 corresponding to the next set of pages pops up. Closing the book by closing its back cover may indicate the ending of a chapter, whereupon turning to the front cover of the book can start the next chapter or trigger an option for the user to select the next chapter.

FIGS. 11B, 11C, 11D, and 11E illustrate various stages of a page turning mechanic, in accordance with an embodiment of the invention. At FIG. 11B, the book object is open to adjacent pages 29.3 and 29.4 in a substantially flat orientation. A virtual character 29.5 is defined on the page 29.3 and a virtual character 29.6 is defined on the page 29.4. At FIG. 11C, the page 29.4 has initiated turning, to expose a page 29.7 and an adjacent page 29.8. On the page 29.7 a tree 29.92 has popped up, and on the page 29.8, a character 29.91 is shown popping up or decompressing from the page 29.8 as the page 29.4 is being turned. An angle θ is defined by the relative orientation of the pages 29.7 and 29.8, and is shown to be acute at the stage shown at FIG. 11C. At FIG. 11D, the page turning continues such that the angle θ is now substantially a right angle. At this stage the character 29.91 has fully popped out of the page 29.8. The orientation of the tree 29.92 relative to the page 29.7 is maintained so that the tree appears to be sideways relative to the character 29.91. Similarly, the orientation of the character 29.6 is maintained relative to the page 29.4 such that the character 29.6 appears to be sideways relative to the character 29.5. At FIG. 11E, the page 29.4 is turned substantially onto the page 29.3, and the characters 29.5 and 29.6 appear to be compressed into the pages 29.3 and 29.4, respectively.

A particular virtual scene may also include specific audio associated therewith. Therefore, in addition to the display of a particular virtual scene, the playback and rendering of the associated audio can also be synchronized to the turning of the pages or cover of the book to the corresponding pages of that particular virtual world in the book object. For example, with continued reference to FIGS. 11B-E, at FIG. 11B only audio from scenes rendered on the pages 29.3 and 29.4 is presented. However, at FIGS. 11C through 11E, as the page 29.4 is turned to expose pages 29.7 and 29.8, audio from scenes rendered on pages 29.7 and 29.8 is mixed with audio from the scenes rendered on pages 29.3 and 29.4 in increasing proportion. When the page turning is complete, and only pages 29.7 and 29.8 are exposed, then only the audio from scenes rendered on those pages is presented. In this manner, presentation of audio from various scenes on various pages transitions as pages are turned, with audio presentation being in proportion to the extent that a given scene is exposed by the page turning mechanic.

Figure 12:
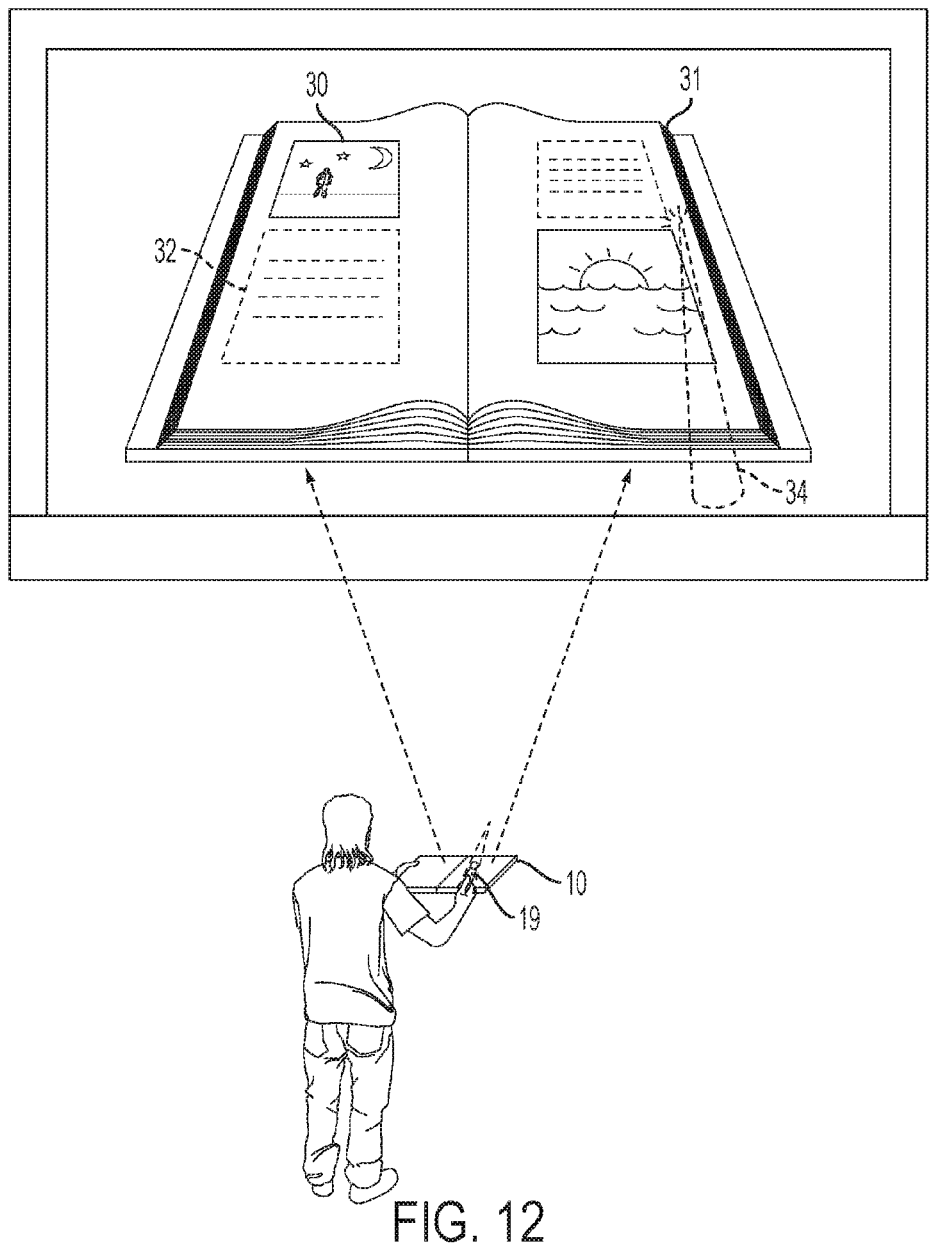
FIG. 12 illustrates a virtual book having graphic regions and text regions, each of which can be selected by maneuvering a wand so as to point to one of the regions, in accordance with an embodiment of the invention.

In another embodiment, the book object provides for interactive selection of AR content and interface with AR content. Portions of the AR content shown over the book's AR tags can be selectable to cause actions to occur. For example, the AR content shown may include pages of a fictional book having various sections. Positioning a selection tool over one of the sections may trigger an action to occur. The selection tool can be controlled by a motion controller such as the Playstation® Move™ controller. FIG. 12 illustrates a virtual book 31 having graphic regions 30 and text regions 32, each of which can be selected by maneuvering a wand 34 so as to point to one of the regions, in accordance with an embodiment of the invention. In the illustrated embodiment, it will be appreciated that the book object 10 has been replaced onscreen by the virtual book 31 whose movement and page turning is controlled by the movement and page turning of the book object 10.

Figure 13:
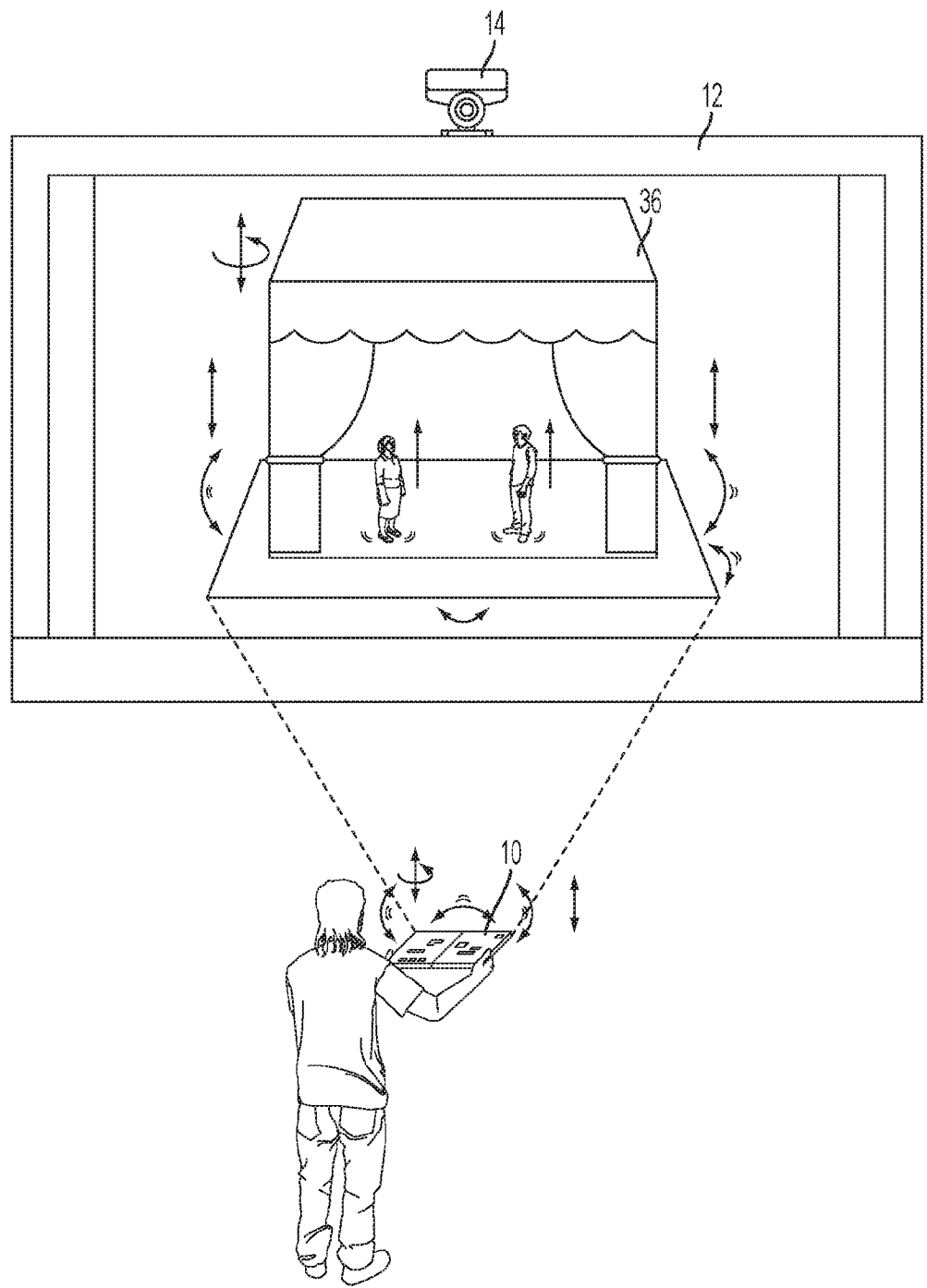
FIG. 13 shows a theater shown on a book, in accordance with an embodiment of the invention.

In various embodiments, the book object can provide for three-dimensional movement of AR tag to permit viewing into distinct spaces. For example FIG. 13 shows a theater shown on the book, in accordance with an embodiment of the invention. By maneuvering the book object, the user can maneuver the theater 36, e.g. rotating, flipping, or translating the theater in various directions. The user is able to look "into" the theater from various perspectives.

Figure 14:
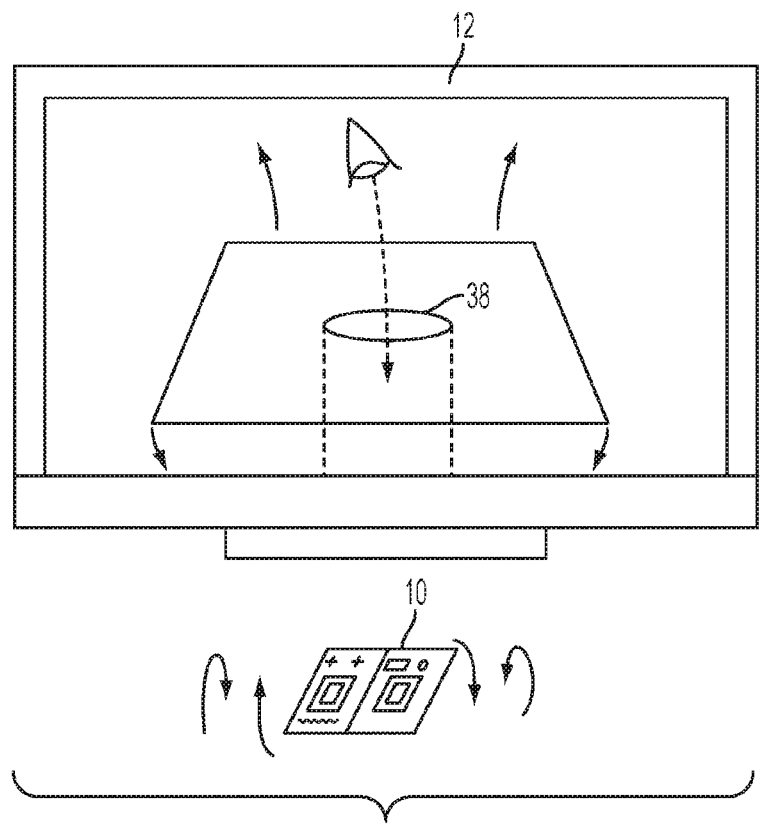
FIG. 14 illustrates a virtual portal rendered on an AR tag, in accordance with an embodiment of the invention.

Additionally, a virtual portal can be rendered on an AR tag. The AR tag is manipulated by the user to enable the user to look into the portal. For example, as shown at FIG. 14, the virtual portal can be a hole 38 on the AR tag and in order to look into the hole, the user must orient the AR tag facing the camera. The portal can be defined to coincide substantially with the surface of the AR tag, or may be defined at a location separate from the AR tag. Movement of the AR tag to a particular orientation relative to the camera is required in order to view into the portal. In another embodiment, the mapping of the movement of the book is such that the user shows the outside covers of the book to the camera in order to look into the hole.

Figure 15:
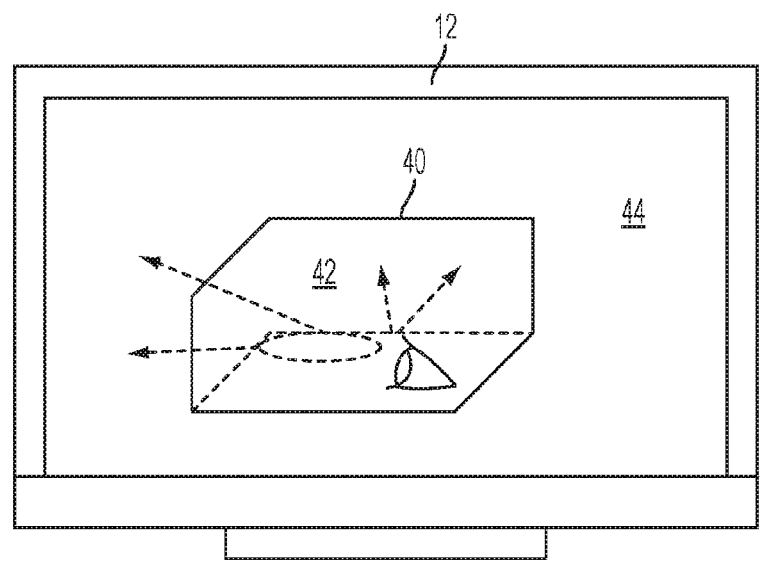
FIG. 15 illustrates another example wherein a virtual portal is rendered on an AR tag, in accordance with an embodiment of the invention.

FIG. 15 illustrates another example wherein a virtual portal is rendered on an AR tag. As shown, the portal 40 is defined on an AR tag, and enables the user to view into a virtual space 42 that is distinct from the virtual space 44 in which the portal 40 exists.

In another embodiment, perspective and context switching between an AR space and a game space can be provided. A user can be interacting within an AR space utilizing an AR tag. The AR space is displayed on screen. From the AR space, the game may transition to a game space by appearing to zoom out from the AR space to reveal the game space. The AR tag is still present in the real space and may be utilized as an anchor to improve the fidelity of tracking objects such as the user or a motion controller. This is demonstrated with reference to FIGS. 4 and 5, as previously discussed.

In another embodiment, there may be transfer of real-world physics to an AR environment. An AR tag is utilized to project a virtual scene including virtual objects. When the AR tag is manipulated by the user, the spatial framework of the virtual scene may move in a substantially immediate manner. However, the virtual objects may exhibit inertia relative to the spatial framework, appearing to lag the movements of the spatial framework. The virtual objects can be accelerated and decelerated based on the movement of the AR tag. The objects may return to their original positions relative to the AR tag, or may move to new positions relative to the AR tag based on the AR tag's movement.

Figure 16:
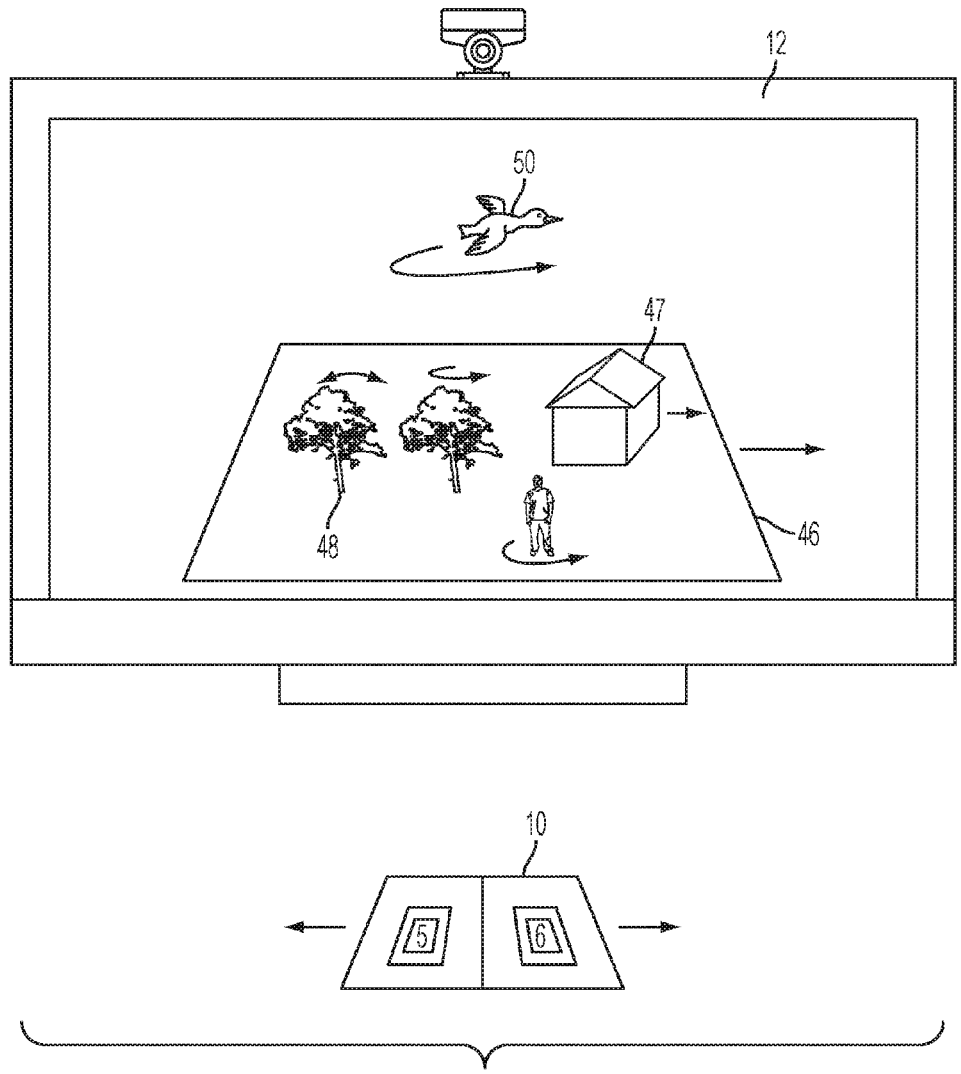
FIG. 16 shows a book object being moved to cause a corresponding movement of a virtual scene shown on a display, in accordance with an embodiment of the invention.

FIG. 16 shows the book object 10 being moved to cause a corresponding movement of a virtual scene shown on display 12, in accordance with an embodiment of the invention. The ground 46 and objects which are rigidly attached thereto, such as building 47, may move in lock step with the movement of the book object 10. Flexible objects having their bases attached to the ground, such as trees 48, may appear to sway while their bases remain attached to the ground 46 with no substantial deviation from the movement of the ground 46. Whereas detached objects such as bird 50 may have their movement lag the movement of the ground 46. In this sense, the movement of the book object 10 can be considered to move a spatial frame of reference in which objects are defined. Objects may have varying degrees of flexibility with respect to movements of the frame of reference, but may ultimately arrive at their original locations relative to the frame of reference.

Figure 17:
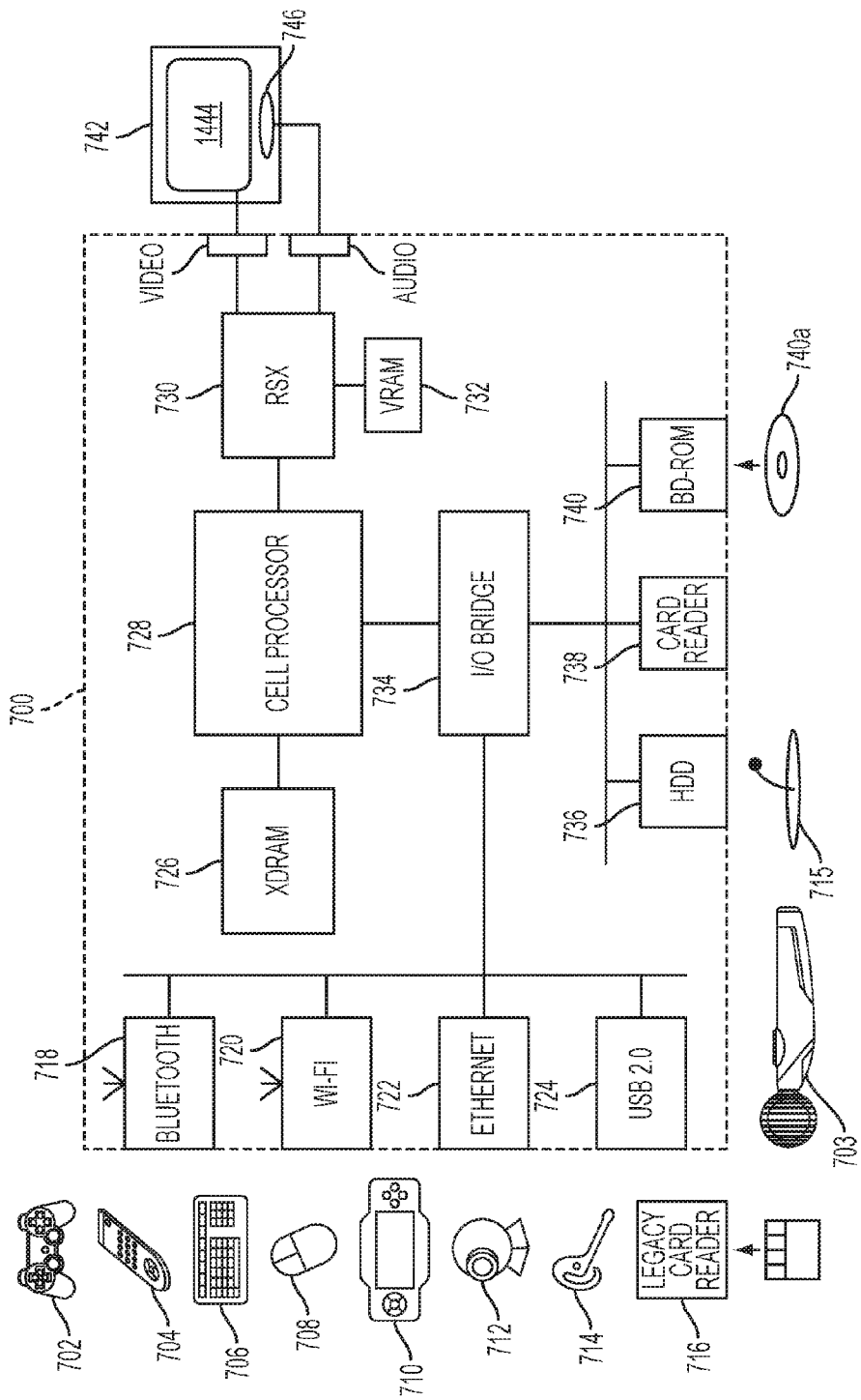
FIG. 17 illustrates hardware and user interfaces that may be used to provide interactivity with a video game, in accordance with one embodiment of the present invention.

FIG. 17 illustrates hardware and user interfaces that may be used to provide interactivity with a video game, in accordance with one embodiment of the present invention. FIG. 17 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 18:
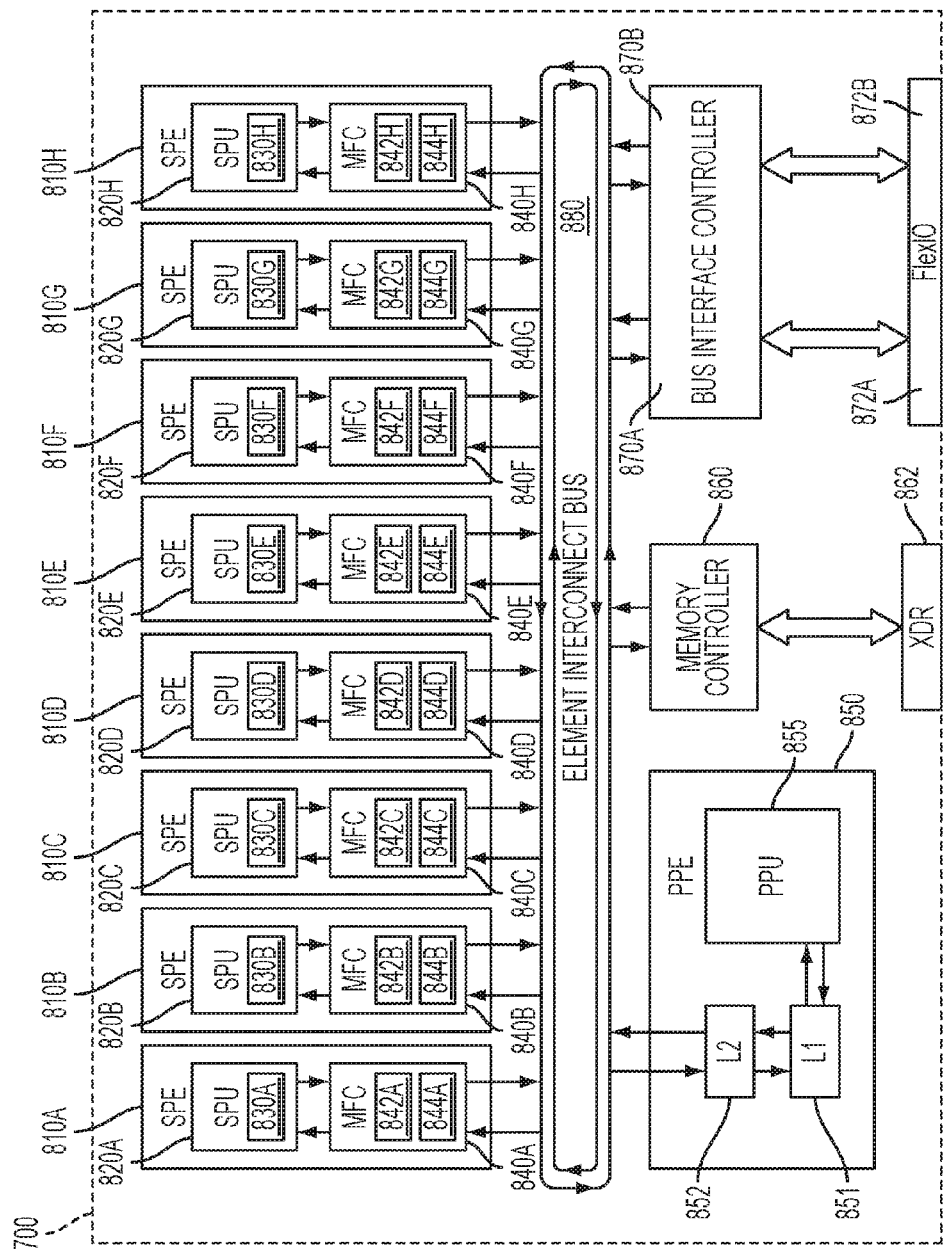
FIG. 18 illustrates additional hardware that may be used to process instructions, in accordance with one embodiment of the present invention.

FIG. 18 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 19:
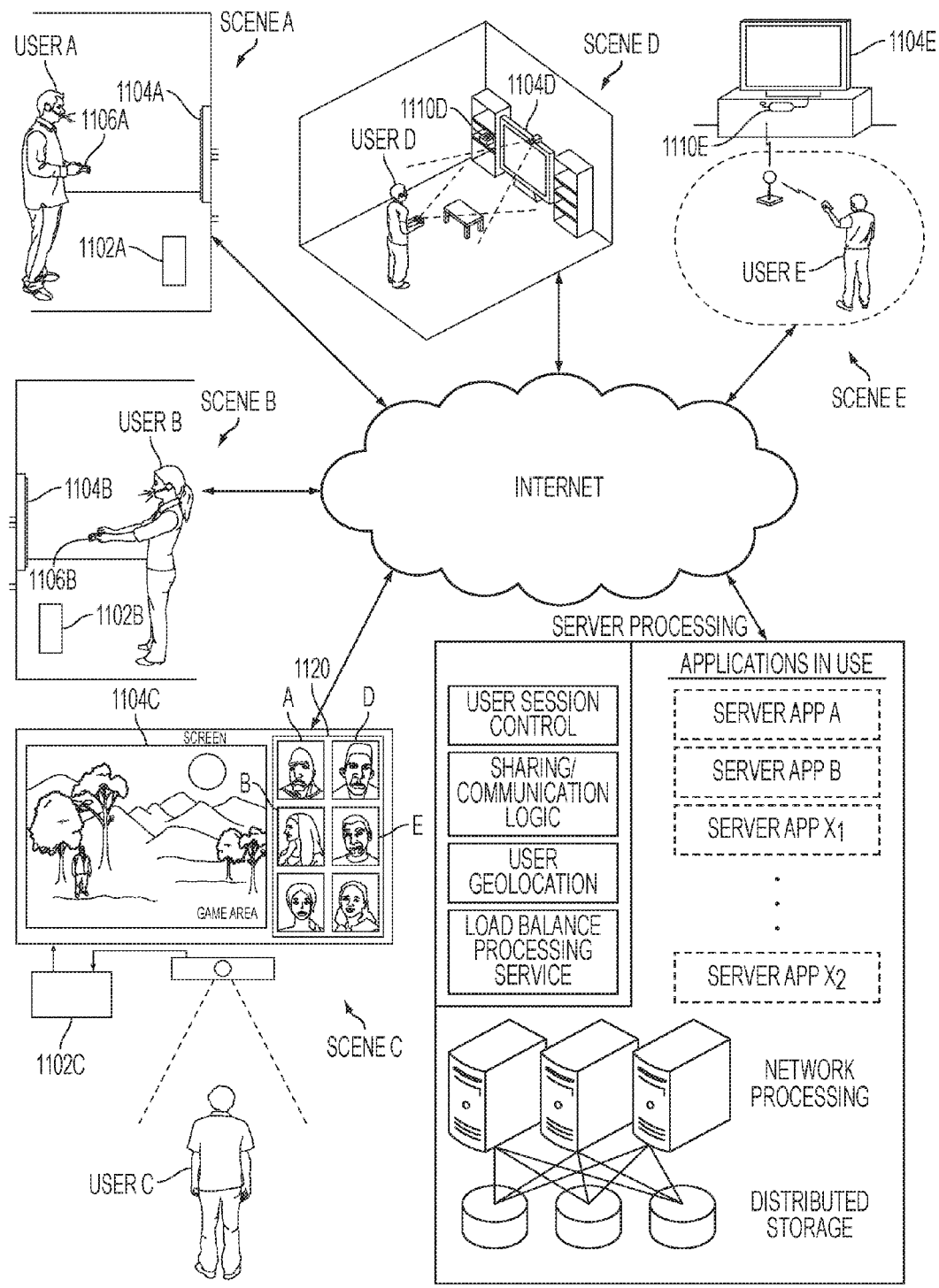
FIG. 19 is an exemplary illustration of scene A through scene E with respective user A through user E interacting with game clients that are connected to server processing via the internet, in accordance with one embodiment of the present invention.

FIG. 19 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 19, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 19 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 20:
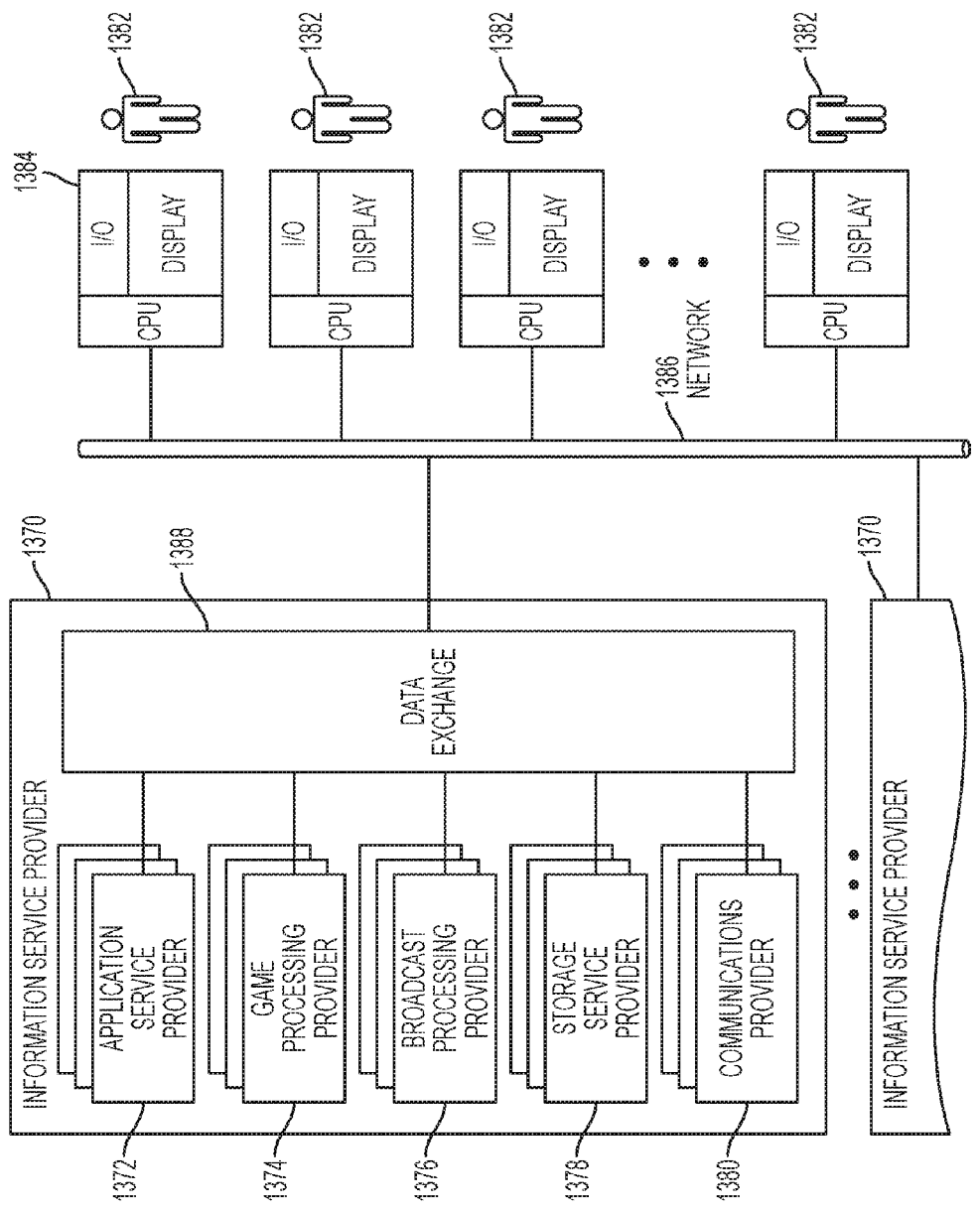
FIG. 20 illustrates an embodiment of an Information Service Provider architecture.

FIG. 20 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents thereof.

What is claimed is:

1. A method for interfacing with an interactive program, comprising:

capturing images of an interface object and a motion controller device disposed in a gameplay environment, the motion controller device being separate from the interface object, the interface object having a tag defined on a surface of the interface object;

analyzing the captured images to identify the tag on the surface of the interface object;

tracking movement of the interface object by tracking the tag on the surface of the interface object;

generating augmented images by replacing, in the captured images, the tag with a virtual object, wherein generating the augmented images includes processing the tracked movement of the interface object to define movement of the virtual object;

analyzing the captured images to identify a pointing direction of the motion controller device in the gameplay environment;

wherein generating the augmented images further includes rendering in the augmented images a selection tool that is maneuverable as controlled by the pointing direction of the motion controller device;

processing the pointing direction of the motion controller device to position the selection tool so as to point towards a selectable region of the virtual object, to further identify a selection of the selectable region of the virtual object; and presenting the augmented images on a display.

2. The method of claim 1,
wherein the virtual object includes a virtual surface corresponding to the surface of the interface object;
wherein movement of the surface of the interface object controls movement of the virtual surface of the virtual object.

3. The method of claim 2, wherein generating the augmented images is configured to render a scene on the virtual surface, the scene defining an animation, wherein the animation defines movement of at least one three-dimensional object in proximity to the virtual surface on which scene defining the animation is defined.

4. The method of claim 1,
wherein the virtual object is a three-dimensional object;
wherein the movement of the virtual object is a rotational or translational movement of the virtual object.

5. The method of claim 4, wherein the rotational movement of the virtual object enables viewing into virtual spaces defined within the virtual object.

6. The method of claim 1, wherein the selection tool is configured to indicate the pointing direction of the motion controller.

7. The method of claim 6,
wherein processing the pointing direction of the motion controller defines a positioning of the selection tool over the selectable region of the virtual object to identify the selection of the selectable region;
wherein the selection of the selectable region of the virtual object triggers an action related to the selectable region.

8. A system for interfacing with an interactive program, comprising:
an image capture device for capturing images of an interface object and a motion controller device disposed in a gameplay environment, the motion controller device being separate from the interface object, the interface object having a tag defined on a surface of the interface object;
a computing device configured to receive the captured images from the image capture device, the computing device being configured to execute the interactive program to define,
an analyzer module for analyzing the captured images to identify the tag on the surface of the interface object;
a tracking module for tracking movement of the interface object by tracking the tag on the surface of the interface object;
an augmented image generator for generating augmented images by replacing, in the captured images, the tag with a virtual object, wherein generating the augmented images includes processing the tracked movement of the interface object to define movement of the virtual object;

wherein the analyzer module is configured to analyze the captured images to identify a pointing direction of the motion controller device in the gameplay environment;

wherein generating the augmented images further includes rendering in the augmented images a selection tool that is maneuverable as controlled by the pointing direction of the motion controller device;

a selection module for processing the pointing direction of the motion controller device to position the selection tool so as to point towards a selectable region of the virtual object, to further identify a selection of the selectable region of the virtual object; and a presenter for presenting the augmented images on a display.

9. The system of claim 8,
wherein the virtual object includes a virtual surface corresponding to the surface of the interface object;
wherein movement of the surface of the interface object controls movement of the virtual surface of the virtual object.

10. The system of claim 9, wherein generating the augmented images is configured to render a scene on the virtual surface, the scene defining an animation, wherein the animation defines movement of at least one three-dimensional object in proximity to the virtual surface on which scene defining the animation is defined.

11. The system of claim 8,
wherein the virtual object is a three-dimensional object;
wherein the movement of the virtual object is a rotational or translational movement of the virtual object.

12. The system of claim 11, wherein the rotational movement of the virtual object enables viewing into virtual spaces defined within the virtual object.

13. The system of claim 8, wherein the selection tool is configured to indicate the pointing direction of the motion controller.

14. The system of claim 13,
wherein processing the pointing direction of the motion controller defines a positioning of the selection tool over the selectable region of the virtual object to identify the selection of the selectable region;
wherein the selection of the selectable region of the virtual object triggers an action related to the selectable region.

15. A system for interfacing with an interactive program, comprising:
a interface object having a tag defined on a surface of the interface object;
a motion controller device, the motion controller device being separate from the interface object;
a client device for capturing images of the interface object and the motion controller in a gameplay environment;
at least one server computer having a processor and memory, including,
an analyzer module for analyzing the captured images to identify the tag on the surface of the interface object;
a tracking module for tracking movement of the interface object by tracking the tag on the surface of the interface object;
an augmented image generator for generating augmented images by replacing, in the captured images, the tag with a virtual object, wherein generating the augmented images includes processing the tracked movement of the interface object to define movement of the virtual object;

wherein the analyzer module is configured to analyze the captured images to identify a pointing direction of the motion controller device in the gameplay environment;

wherein generating the augmented images further includes rendering in the augmented images a selection tool that is maneuverable as controlled by the pointing direction of the motion controller device;

a selection module for processing the pointing direction of the motion controller device to position the selection tool so as to point towards a selectable region of the virtual object, to further identify a selection of the selectable region of the virtual object; and wherein the client device includes a presenter for presenting the augmented images on a display.

16. The system of claim 15, wherein the virtual object includes a virtual surface corresponding to the surface of the interface object;

wherein movement of the surface of the interface object controls movement of the virtual surface of the virtual object.

17. The system of claim 16, wherein generating the augmented images is configured to render a scene on the virtual surface, the scene defining an animation, wherein the animation defines movement of at least one three-dimensional object in proximity to the virtual surface on which scene defining the animation is defined.

18. The system of claim 15, wherein the virtual object is a three-dimensional object;

wherein the movement of the virtual object is a rotational or translational movement of the virtual object.

19. The system of claim 18, wherein the rotational movement of the virtual object enables viewing into virtual spaces defined within the virtual object.

20. The system of claim 15, wherein the selection tool is configured to indicate the pointing direction of the motion controller;

wherein processing the pointing direction of the motion controller defines a positioning of the selection tool over the selectable region of the virtual object to identify the selection of the selectable region;

wherein the selection of the selectable region of the virtual object triggers an action related to the selectable region.

* * * * *